United States Patent [19]
Smith, Sr.

[11] Patent Number: 5,696,709
[45] Date of Patent: Dec. 9, 1997

[54] PROGRAM CONTROLLED ROUNDING MODES

[75] Inventor: Ronald Morton Smith, Sr., Wappingers Falls, N.Y.

[73] Assignee: International Business Machines Corporation, Armonk, N.Y.

[21] Appl. No.: 414,866

[22] Filed: Mar. 31, 1995

[51] Int. Cl.$^6$ .................................................. G06F 7/38
[52] U.S. Cl. ................................. 364/745; 364/748
[58] Field of Search .................... 364/745, 748, 364/715.04

[56] References Cited

U.S. PATENT DOCUMENTS 4,823,260  4/1989  Imel et al. ............................ 364/745 X

*Primary Examiner*—Tan V. Mai
*Attorney, Agent, or Firm*—Lynn L. Augspurger; David V. Rossi

[57] ABSTRACT

A computer system having a default floating point rounding mode that may be overridden by a rounding mode designated by an instruction. The current machine rounding mode is stored in a register, and an instruction includes a field for specifying whether rounding should be performed according to the current rounding mode or according to another rounding mode during execution thereof.

12 Claims, 3 Drawing Sheets

| MNEMONIC | OPERANDS |
|---|---|
| FIER | SHORT |
| FIDR | LONG |
| FIXR | EXTENDED |

| MNEMONIC | OPERANDS |
|---|---|
| CWER | SHORT OPERAND, 32-BIT BINARY-INTEGER RESULT |
| CWDR | LONG OPERAND, 32-BIT BINARY-INTEGER RESULT |

| BYTE | BITS | VALUE | FUNCTION |
|---|---|---|---|
| 0 | 0 | | BFP-INVALID-DATA MASK |
| | 1 | | BFP-DIVISION-BY-ZERO MASK |
| | 2 | | BFP-OVERFLOW MASK |
| | 3 | | BFP-UNDERFLOW MASK |
| | 4 | | BFP-INEXACT MASK |
| | 5-7 | | (UNASSIGNED) |
| 1 | 0 | | BFP-INVALID-DATA FLAG |
| | 1 | | BFP-DIVISION-BY-ZERO FLAG |
| | 2 | | BFP-OVERFLOW FLAG |
| | 3 | | BFP-UNDERFLOW FLAG |
| | 4 | | BFP-INEXACT FLAG |
| | 5-7 | | (UNASSIGNED) |
| 2 | 0-7 | | DATA-EXCEPTION CODE (DXC) |
| 3 | 0 | | QNaN MODE |
| | 1-5 | | (UNASSIGNED) |
| | 6-7 | | ROUNDING MODE |
| | | 00 | ROUND TO NEAREST |
| | | 01 | ROUND TO ZERO |
| | | 10 | ROUND UP |
| | | 11 | ROUND DOWN |

PROGRAM CONTROLLED ROUNDING MODES

FIELD OF THE INVENTION

The present invention relates to computer systems and, more particularly, to a computer architecture which includes instructions providing for programmable control of a rounding mode.

BACKGROUND OF THE INVENTION

In the ensuing description of the prior art and the present invention, the following are herein incorporated by reference:

"Enterprise Systems Architecture/390 Principles of Operation," Order No. SA22-7201-02, available through IBM branch offices, 1994;

"IEEE standard for binary floating-point arithmetic, ANSI/IEEE Std 754-1985," The Institute of Electrical and Electronic Engineers, Inc., New York, August 1985; and Commonly assigned U.S. patent application Ser. No. 08/414,250 to Eric Mark Schwarz, et al., filed Mar. 31, 1995, and entitled "Implementation of Binary Floating Point Using Hexadecimal Floating Point Unit".

In past architectures, rounding was provided either by means of a mode which controlled the rounding on all instructions, or by means of special rounding instructions. Each of these schemes has advantages and disadvantages. The mode has an advantage when a particular rounding mode is desired for an extended period of time. The special instructions have an advantage when a specific rounding is required for a single operation.

It would be advantageous, however, to have a machine which incorporates both a rounding mode and a rounding instruction.

SUMMARY OF THE INVENTION

The present invention overcomes the above, and other, prior art limitations by providing a machine having a default rounding mode that may be overridden by a rounding mode designated by an instruction. The current machine rounding mode is stored in a register, and an instruction includes a field for specifying whether rounding should be performed according to the current rounding mode or according to another rounding mode during execution thereof.

BRIEF DESCRIPTION OF THE DRAWINGS

Additional aspects, features, and advantages of the invention will be understood and will become more readily apparent when the invention is considered in the light of the following description made in conjunction with the accompanying drawings, wherein:

FIG. 4 illustrates the format of a floating-point-control (FPC) register, including bits for indicating a rounding mode, in accordance with the present invention;

DETAILED DESCRIPTION OF THE INVENTION

Figure 1:
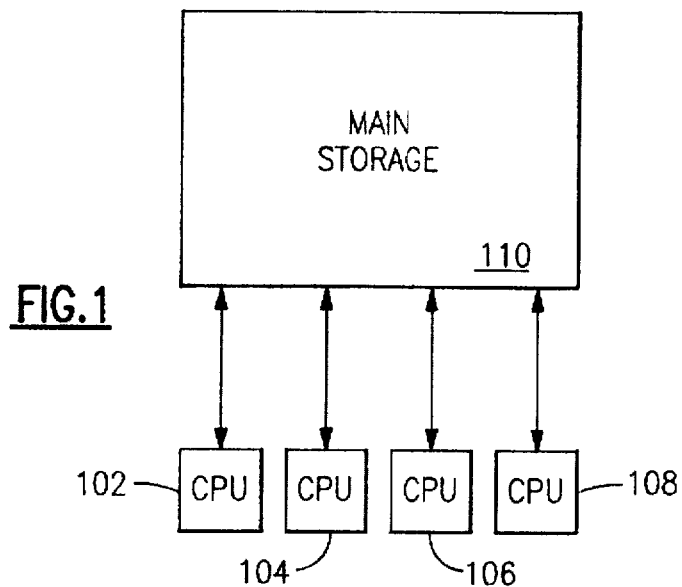
FIG. 1 illustrates a conventional shared memory computer system which may be employed to implement the present invention.
Figure 2:
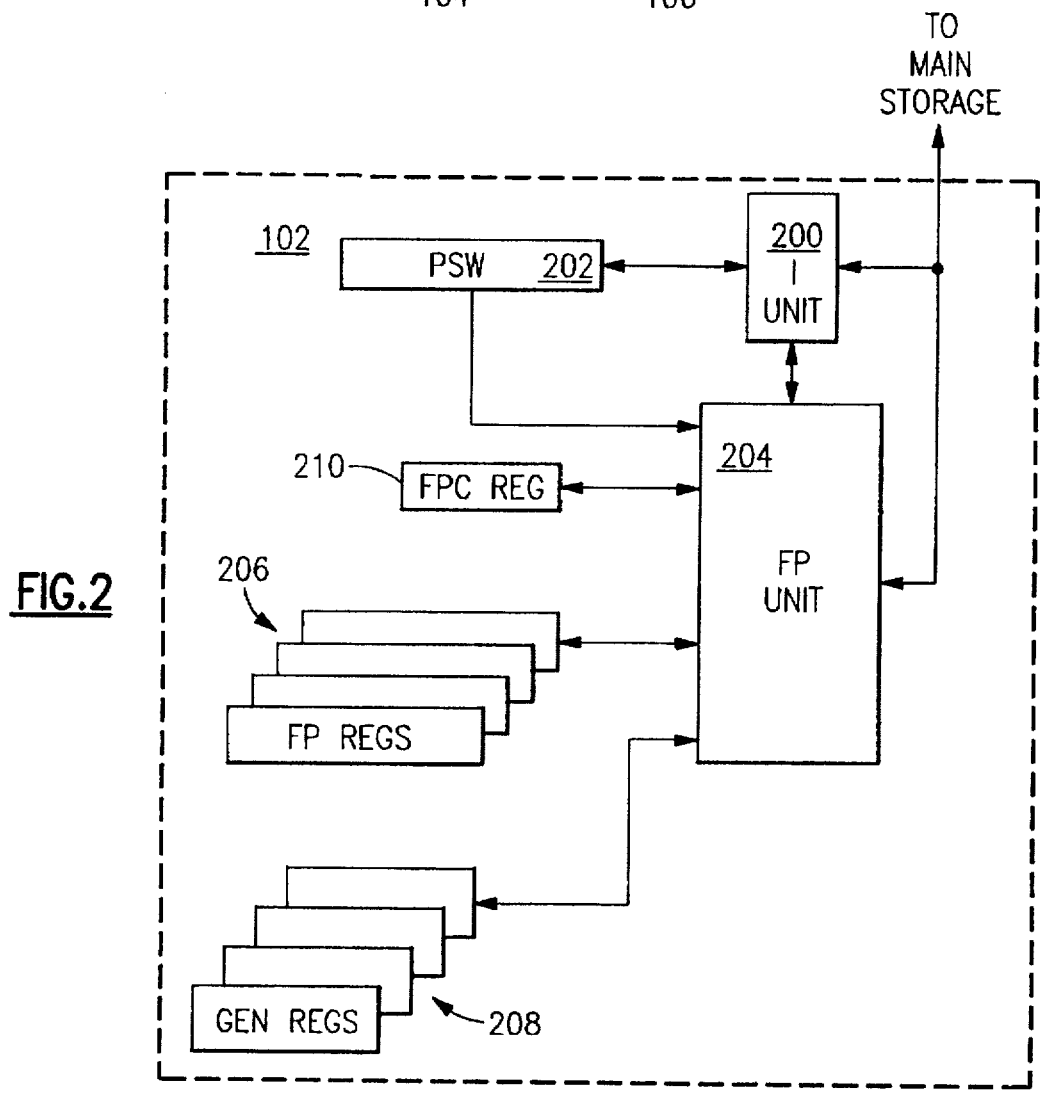
FIG. 2 schematically depicts functional components included in a CPU which may be employed in accordance with the present invention.

FIG. 1 illustrates a conventional shared memory computer system including a plurality of central processing units (CPUs) 102–108 all having access to a common main storage 110. FIG. 2 schematically depicts functional components included in a CPU from FIG. 1. Instruction unit 200 fetches instructions from common main storage 110 according to an instruction address located in the program status word (PSW) register 202, and appropriately effects execution of these instructions. Instruction unit 200 appropriately hands off retrieved floating point instructions to floating point unit 204, along with some of the operands that may be required by the floating point unit to execute the instruction. Floating point (FP) unit 204 includes all necessary hardware to execute the floating point instruction set, and preferably, in accordance with an embodiment of the present invention, supports both Binary and Hexadecimal floating point formats. FP unit 204 is coupled to floating point (FP) registers 206, which contain floating point operands and results associated with FP unit 204 processing, and is also coupled to general registers 208. FP unit 204 is also coupled to floating point control (FPC) register 210, which preferably includes mask bits in addition to those provided in the PSW, as well as bits indicating the floating point mode. In a multi-user application, FPC register 210 is under control of the problem state.

Figure 3:
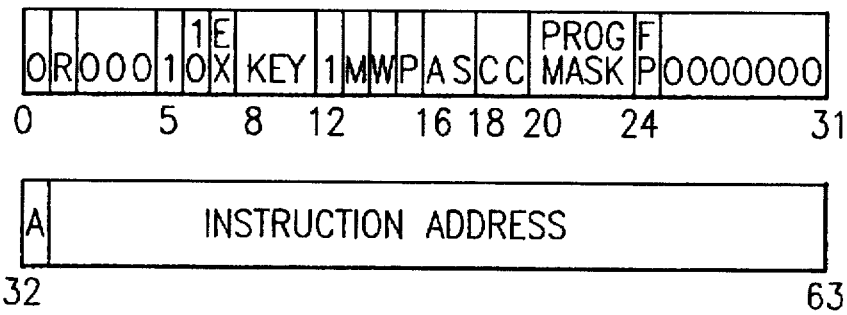
FIG. 3 illustrates the format of a 64 bit program status word (PSW), including a bit for indicating a binary or hexadecimal floating point mode, in accordance with an embodiment of the present invention.

FIG. 3 illustrates the format of a 64 bit PSW as stored in PSW register 202. In a multi-user application, the supervisor state saves the PSW for a given problem state when taking interruption to dispatch another problem state. It can be seen that PSW includes program mask bits 20–23.

FP-Mode Bit in PSW

Bit 24 of the PSW is the FP-mode bit. In accordance with an embodiment of the present invention whereby both binary and hexadecimal floating point modes are supported, when the bit is zero, the CPU is in the hexadecimal-floating-point (HFP) mode, and floating-point operands are interpreted according to the HFP format. When the bit is one, the CPU is the binary-floating-point (BFP) mode, and floating-point operands are assumed to be in the BFP format. Some floating-point instructions operate the same in either mode.

When an instruction is executed which is not available in the current FP mode, a special-operation exception is recognized.

FPC Register

As illustrated in detail by FIG. 4, the floating-point-control (FPC) register 210 is a 32-bit register, which contains the mode (i.e., rounding mode), mask, flag, and code bits. For this implementation, by way of example, the rounding mode is represented by the last two bits of the last byte. Round to nearest, round to zero, round up, and round down modes are supported.

Program Controlled Rounding Modes

Figure 5:
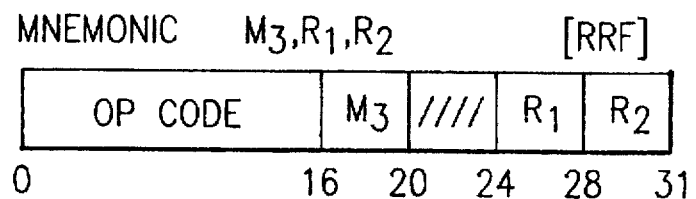
FIG. 5 illustrates the format of a LOAD FP Integer instruction, including a rounding mode field, in accordance with the present invention.

In accordance with the present invention, the rounding mode indicated by the FPC register 210 may be superceded by certain instructions that are executed. Two instructions, LOAD FP INTEGER and CONVERT TO FIXED, are provided as examples of an embodiment of implementing program controlled rounding modes according to the present invention, which is not limited thereto. FIG. 5 illustrates the format of a LOAD FP Integer instruction which may be executed by FP Unit 204. Execution of this instruction results in a floating point number located in a FP register 206 identified by the second operand $R_2$ being rounded to an integer value in the same floating-point format, with the result placed in the first-operand location $R_1$ which identifies a floating point register 206. The resulting integer, which remains in floating-point format, either hexadecimal or binary, should not be confused with binary integers, which use a fixed-point format. If the floating-point operand is numeric with a large enough exponent so that it is already an integer, the FPC Register As illustrated in detail by FIG. 4, the floating-point-control (FPC) register 210 is a 32-bit register, which contains the mode (i.e., rounding mode), mask, flag, and code bits. For this implementation, by way of example, the rounding mode is represented by the last to bits of the last byte. Round to nearest, round to zero, round up, and round down modes are supported.

Program Controlled Rounding Modes

In accordance with the present invention, the rounding mode indicated by the FPC register 210 may be superceded by certain instructions that are executed. Two instructions, LOAD FP INTEGER and CONVERT TO FIXED, are provided as examples of an embodiment of implementing program controlled rounding modes according to the present invention, which is not limited thereto. FIG. 5 illustrates the format of a LOAD FP Integer instruction which may be executed by FP Unit 204. Execution of this instruction results in a floating point number located in a FP register 206 identified by the second operand $R_2$ being rounded to an integer value in the same floating-point format, with the result placed in the first-operand location $R_1$ which identifies a floating point register 206. The resulting integer, which remains in floating-point format, either hexadecimal or binary, should not be confused with binary integers, which use a fixed-point format. If the floating-point operand is numeric with a large enough exponent so that it is already an integer, the result value remains the same, except that, in the HFP mode, an unnormalized operand is normalized, and an operand with a zero fraction is changed to a true zero.

In accordance with an embodiment of the present invention, a modifier in the $M_3$ field controls the method of rounding in the BFP mode. The second operand, if numeric, is rounded to an integer value as specified by the modifier in the $M_3$ field:

$M_3$ Rounding Method

0 According to current rounding mode

1 Biased round to nearest

4 Round to nearest

5 Round to zero

6 Round up

7 Round down

When the modifier field is zero, rounding is controlled by the current rounding mode in the FPC register. When the field is not zero, rounding is performed as specified by the modifier, regardless of the current rounding mode. Rounding for modifiers 4–7 is the same as for rounding modes 0–3 (binary 00–11), respectively. Biased round to nearest (modifier 1) is the same as round to nearest (modifier 4), except when the second operand is exactly halfway between two integers, in which case the result for biased rounding is the next integer that is greater in magnitude. It may be understood that, in accordance with an embodiment of the present invention where both hexadecimal and binary floating point are supported, if the modifier is 5, the mehtod of rounding is the same in the HFP and BFP modes.

Figure 6:
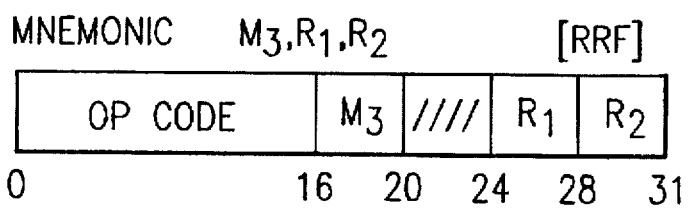
FIG. 6 illustrates the format of a Convert to Fixed instruction, including a rounding mode field, in accordance with the present invention.

FIG. 6 illustrates the format of a Convert to Fixed instruction which may be executed by FP Unit 204. Execution of this instruction results in a floating point number located in a FP register 206 identified by the second operand $R_2$ being converted to a binary-integer, fixed-point format, with the result placed in the first-operand location $R_1$ which identifies a general register 208.

The result of CWDR and CWER is a 32-bit signed binary integer that is placed in the general register designated by $R_1$. A modifier in the $M_3$ field controls the method of rounding.

If the second operand is numeric, finite, and not already an integer, it is converted to an integer value in the fixed-point format by rounding as specified by the modifier in the $M_3$ field:

$M_3$ Rounding Method

0 According to current rounding mode

1 Biased round to nearest

4 Round to nearest

5 Round to zero

6 Round up

7 Round down

When the modifier field is zero, rounding is controlled by the current rounding mode in the FPC register 210. When the field is not zero, rounding is performed as specified by the modifier, regardless of the current rounding mode. Rounding for modifiers 4–7 is the same as for rounding modes 0–3 (binary 00–11), respectively. Biased round to nearest (modifier 1) is the same as round to nearest (modifier 4), except when the second operand is exactly halfway between two integers, in which case the result for biased rounding is the next integer that is greater in magnitude.

A modifier other than 0, 1, or 4–7 is invalid. The sign of the result is the sign of the second operand, except that a zero result has a plus sign. Note that if the modifier is 5, the method of rounding is the same in the HFP and BFP modes.

Although the above description provides many specificities, these enabling details should not be construed as limiting the scope of the invention, and it will be readily understood by those persons skilled in the an that the present invention is susceptible to many modifications, adaptations, and equivalent implementations without departing from this scope and without diminishing its attendant advantages. It is therefore intended that the present invention is not limited to the disclosed embodiments but should be defined in accordance with the claims which follow.

What is claimed is:

1. A computer system, comprising:
   a storage device including at least one stored bit for specifying one of plurality of rounding modes as a default rounding mode; and
   a processor that executes a floating point instruction having a field that is operative to selectively override said default rounding mode with another of said rounding modes during execution of said floating point instruction by said processor;
   wherein said rounding modes each specify a respective rounding direction applied to a floating point number.

2. The computer system according to claim 1, wherein said processor supports binary floating point format and hexadecimal floating point format.

3. The computer system according to claim 2, wherein said floating point instruction is common to said binary floating point format and said hexadecimal floating point format.

4. The computer system according to claim 1, wherein said floating point rounding modes include rounding modes specified by IEEE Std 754-1985 standards.

5. The computer system according to claim 1, wherein said floating point rounding modes include a biased round to nearest mode.

6. The computer system according to claim 1, wherein said floating point instruction includes a convert to fixed instruction.

7. The computer system according to claim 1, wherein said floating point instruction includes a load floating point integer instruction.

8. The computer system according to claim 1, wherein said field has a value which indicates that said default rounding mode is operative during execution of said floating point instruction by said processor.

9. A computer system including a plurality of floating point rounding modes, each of said floating point rounding modes specifying a respective rounding direction applied to a floating point number, said system comprising:

a storage element containing a value that specifies one of a plurality of rounding modes as a default rounding mode;

an instruction including a modifier field that selectively indicates another of said plurality of rounding modes; and a processor that executes said instruction to provide a result of a given accuracy which is generated by rounding a floating point number having greater accuracy than the result, the rounding executed according to said default rounding mode when said modifier field does not override said default mode, and the rounding executed according to said another rounding mode when said modifier field overrides said default rounding mode, the rounding thereby being executed in response to said modifier field of said instruction.

10. The computer system according to claim 9, wherein said modifier field includes a value which indicates that said default rounding mode is operative during execution of said instruction by said processor.

11. A computer system including a plurality of floating point rounding modes, each of said floating point rounding modes specifying a respective rounding direction applied to a floating point number, said system comprising:

means for storing a value for specifying one of said floating point rounding modes as a default rounding mode; and means for executing a floating point instruction having a field that is operative to selectively override said default rounding mode with another of said rounding modes during execution of said floating point instruction by said processor.

12. The computer system according to claim 11, wherein said field has a value which indicates that said default rounding mode is operative during execution of said floating point instruction.

* * * * *